No. 752,557. PATENTED FEB. 16, 1904.
S. A. HUNTLEY.
MEANS FOR RELEASING TARGET TRAPS.
APPLICATION FILED DEC. 18, 1902.
NO MODEL. 2 SHEETS—SHEET 1.
Fig. 1.
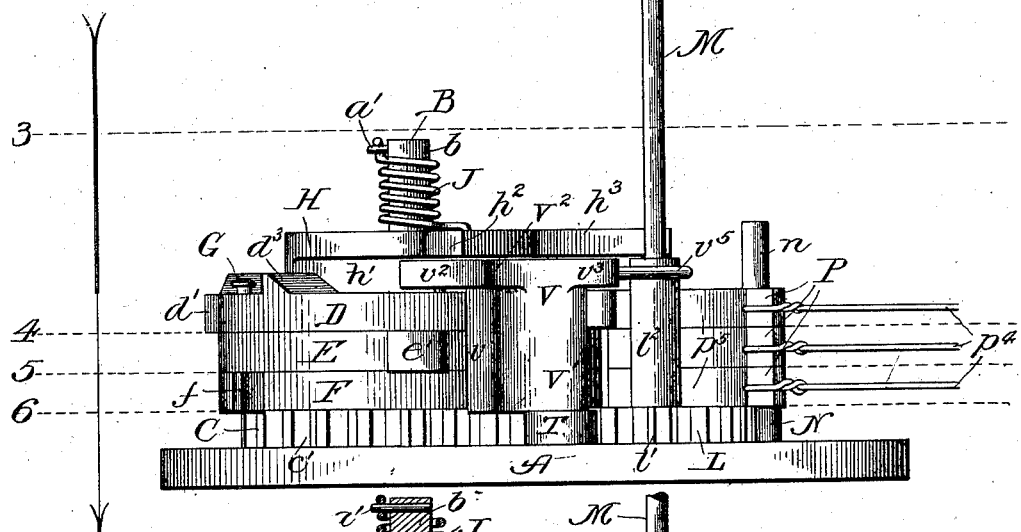
Fig. 2.
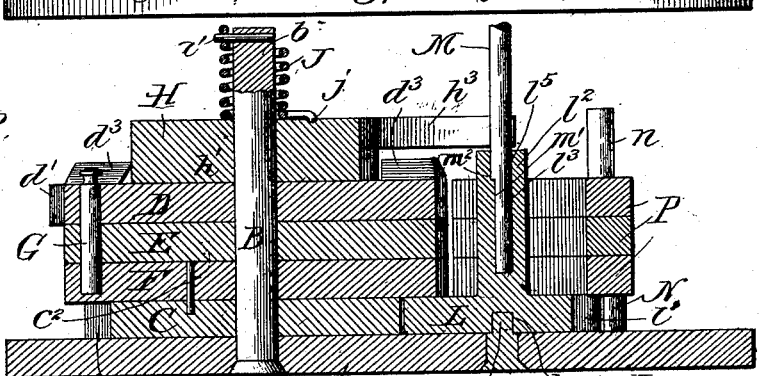
Witnesses: Inventor:
Stephen A. Huntley,
By Dyrenforth, Dyrenforth & Lee,
Att'ys.

No. 752,557. PATENTED FEB. 16, 1904.
S. A. HUNTLEY.
MEANS FOR RELEASING TARGET TRAPS.
APPLICATION FILED DEC. 18, 1902.
NO MODEL. 2 SHEETS—SHEET 2.
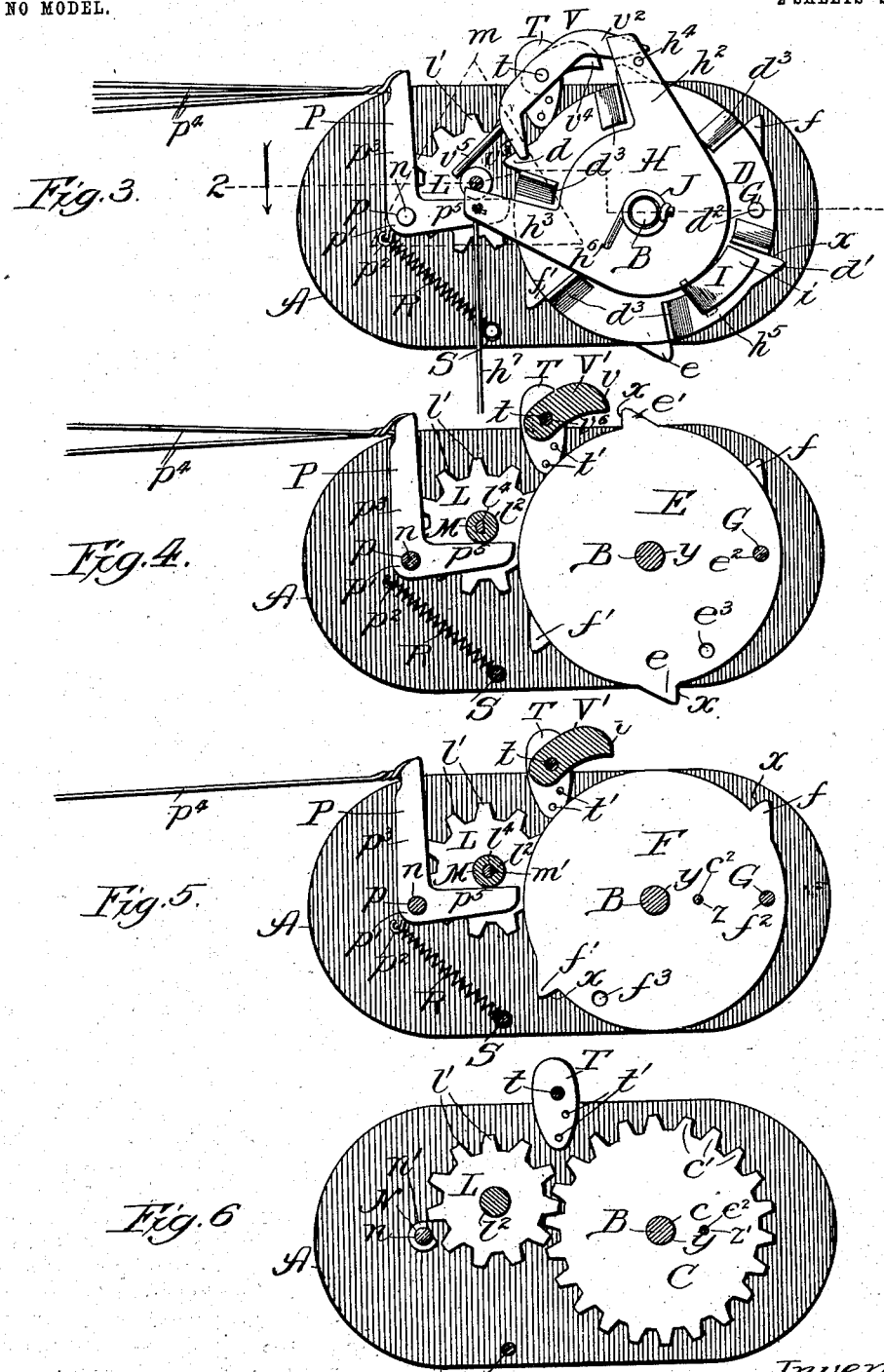

No. 752,557. Patented February 16, 1904.

UNITED STATES PATENT OFFICE.

STEPHEN A. HUNTLEY, OF SIOUX CITY, IOWA, ASSIGNOR TO HARVEY H. HAWMAN, WILLIAM F. DUNCAN, JOSEPH W. GRAY, AND CHARLES H. HUNTER, OF SIOUX CITY, IOWA.

MEANS FOR RELEASING TARGET-TRAPS.

SPECIFICATION forming part of Letters Patent No. 752,557, dated February 16, 1904.

Application filed December 18, 1902. Serial No. 135,736. (No model.)

*To all whom it may concern:*

Be it known that I, STEPHEN A. HUNTLEY, a citizen of the United States, residing at Sioux City, in the county of Woodbury and State of Iowa, have invented a new and useful Improvement in Mechanism for Actuating Traps and the Like, of which the following is a specification.

My invention relates to trigger mechanism adapted to release a series of traps of the kind employed in shooting contests, although it will appear the invention is adapted to analogous purposes; and my primary object is to provide trap-pull mechanism which will mechanically give the movement of the cord necessary to set in operation the trap-release mechanism connected thereto and which will indicate to the shooter, trapper, and trap-puller which trap is being released, thus lessening the danger of injury to the trapper through a mistake in releasing the wrong trap or on account of misunderstanding by the shooter as to which trap is to be released, and which will permit of the release of all the traps in connection with the actuating mechanism or alternate release of the traps, as desired.

The invention is illustrated in the accompanying drawings, in which—

Figure 1 is a side elevation of the trap-pull mechanism; Fig. 2, a vertical sectional view taken on line 2 of Fig. 3 and viewed in the direction of the arrow; Fig. 3, a sectional view taken on line 3 of Fig. 1 and viewed in the direction of the arrow; Fig. 4, a sectional view taken on line 4 of Fig. 1 and viewed in the direction of the arrow; Fig. 5, a sectional view taken on line 5 of Fig. 1 and viewed in the direction of the arrow, and Fig. 6 a sectional view taken on line 6 of Fig. 1 and viewed in the direction of the arrow.

In the preferred construction, A represents the base or standard to which an upright spindle B is rigidly secured.

C is a gear provided with teeth $c'$ and a perforation $c$, through which the spindle B extends.

D, E, and F are circular trigger-actuating disks, each provided with a perforation $y$, through which the spindle B extends, and at opposite points on their circumferential surfaces with trigger-actuating teeth $d\ d'$, $e\ e'$, and $f\ f'$, respectively, each tooth having an abrupt shoulder $x$ facing in the same direction. The disks are further provided with perforations $d^2$, $e^2\ e^3$, $f^2\ f^3$, respectively, each perforation adapted to receive the pin G. The top trigger-actuating disk D is further provided with ratchet-teeth $d^3$, all facing in the same direction, but in a direction opposite to that of the circumferential teeth $d\ d'$, $e\ e'$, $f\ f'$. The lower trigger-actuating disk F is secured to the gear C to rotate therewith, as by a rivet $c^2$, which passes through a perforation $z$ in the disk F and into a socket $z'$ in the gear C. A pawl-controlled actuating member or plate H is journaled on the spindle B. The lower portion of the member H is cut away to form the circular portion $h'$, which permits of the oscillation of the plate H within the circle of the ratchet-teeth $d^3$. The upper portion of the plate H is generally circular in form and is provided with two laterally-extending arms $h^2\ h^3$. The arm $h^2$ carries a downwardly-extending pin $h^4$, and the arm $h^3$ has attached to it a cord $h^7$ or other actuating medium. A pin $h^5$, rigidly secured to the plate H in its circumferential side at a point opposite to the arms $h^2\ h^3$ and approximately in the same plane, passes through a transverse perforation in a gravity-pawl I, which is thus secured to the circumferential surface of the plate H and normally engages the ratchet-tooth-equipped disk D. A spring J encircles the upper portion $b$ of the spindle B, a pin $a'$, secured to the spindle B, serving as a means of attachment for one end of the spring, and a perforation $h^6$ in the plate H serving to engage the downwardly-turned end $j$ of the spring J to hold the spring under tension.

K is a stud which projects above the base A and into a circular recess $l$ in a pinion L, provided with gear-teeth $l'$, which intermesh with the teeth on the gear C and are of one-half the number contained on said last-named gear. The pinion L has an upwardly-extending integral hub portion $l^2$. The hub portion $l^2$ is provided with sockets $l^3$, having a flat side $l^4$ in its lower portion and drilled to circular form in its upper portion, as shown at $l^5$ in Fig. 2. A spindle M, carrying a triangular signal-head $m$, secured to the upper end of said spindle, has signals indicated on its sides, as 1, 2, and 3, respectively. The spindle M is located in the path of the arm $h^3$ of the plate H, thus serving as an abutment for the arm $h^3$ to hold the spring at a tension. The lower end of the spindle M rests in the socket $l^3$ and is cut away to form a flat side $m'$, terminating in a shoulder $m^2$, to permit of a fixed position in said socket in relation to any fixed point on the pinion L. A spindle N, having a reduced portion $n$ and a shoulder $n'$, located in a plane above that of the gear L, is secured to the base A, the reduced portion $n$ passing through perforations $p$ in a series of spring-held triggers P, corresponding in number to the disks D, E, and F and in corresponding planes. Each trigger P is in the form of a bell-crank lever and is fulcrumed on the spindle N, and at its fulcrumed portion $p'$ and extending outwardly hooks $p^2$ are rigidly secured, to which are attached springs R, secured at their opposite ends to a spindle S, which is rigidly attached to the base A. To the arm $p^3$ of the triggers are attached wires or cords $p^4$ in any suitable manner, said cords or wires passing from the triggers to the trap-retainers. The ends of the arms $p^5$ of the triggers P abut and are held against the hub portion $l^2$ of the pinion L by the springs R and extend into the path of the trigger-actuating teeth $d\ d'$, $e\ e'$, $f\ f'$ on the disks D, E, and F. A block T, provided with a rigidly-attached upwardly-extending spindle $t$, is rigidly secured to the base A by pins $t'$ and projects beyond the edge of the base A.

V represents escapement mechanism having the downwardly-projecting portion V', provided with a flat side terminating in a shoulder $v$, and a bifurcated upper portion $V^2$, presenting the straight portion $v'$ and two curved arms $v^2\ v^3$, each of which arms is provided with a straight side surface $v^4$. A pin $v^5$, rigidly secured to the outside surface of the arm $v^3$, extends outwardly approximately in a line with the straight portion $v'$ of the upper portion $V^2$. The escapement V is drilled to provide a perforation $v^6$, which receives the spindle $t$ and serves as an axis about which the escapement oscillates.

The operation of the improved device is as follows: Each of the three triggers is connected with the retainer or catch of one of the three traps in connection with which the device is used. Thus we will assume that the side of the signal which is numbered 1 is turned toward the shooter, that one of the trigger-actuating teeth of the upper disk D is in engagement with the upper trigger and ready to actuate the same, that the upper trigger is connected with the trap that is designated 1, and that the disks are connected together so as to actuate the triggers successively, the intermediate and lower triggers being connected, respectively, with the traps numbered 2 and 3. With this arrangement when the disk-actuating member H is moved by drawing upon the cord $h^7$ the first or upper trigger is operated and the first of the series of traps opened. In the manual operation of the member H in one direction the pin $h^4$ engages the arm $v^3$ of the escapement and turns the latter to bring the shoulder $v$ into the path of the succeeding trigger-actuating tooth of the intermediate disk E, and during this same manual movement the pinion L is turned through one-third of a revolution to cause the signal to indicate the number of the next trap to be released. During the return movement of the plate H under the action of its spring the pin $h^4$ engages the arm $v^2$ of the escapement and moves the escapement in the other direction, thereby removing the obstruction $v$ from the path of the trigger-actuating teeth. As the member H moves in one direction the disks are moved through the medium of the pawl I, and at the return movement of the member H the pawl I engages a fresh ratchet-tooth upon the upper disk. Upon a second actuation of the plate H the disks are again moved forward the space of one-sixth of a revolution, and the second trigger is actuated to release trap No. 2. Upon a third actuation of the member H the lower trigger is actuated and caused to release trap No. 3. A fourth actuation causes the first or upper trigger to be actuated again, and so on.

When desired, the disks may be coupled together so as to bring the trigger-actuating teeth into vertical alinement, so that all the traps will be operated simultaneously, or the disks may be so connected as to cause two of the traps to be operated simultaneously, while the third is operated alone.

It is obvious that the signal may or may not be operated, depending upon whether the lower disk is connected with and actuated by the other disk or not, it being necessary to move the gear C in order to actuate the signal. As a safety feature the pawl I may be thrown back on its pivot out of engagement with the ratchet-teeth.

It will be obvious that my invention may be embodied in other forms of mechanism and that the mechanism can be used for purposes analogous to the purpose above described.

While it is preferred, for instance, to have the different indicating means of the signal combined and carried by a single standard, yet this construction may be varied without departure from my invention. The gist of the invention lies in the plurality of indicating means for the signal and the plurality of trap-actuating means, together with means for changing the signal to indicate which trap is to be pulled.

Changes in details of construction within the spirit of my invention may be made. Hence no undue limitation is to be understood from the foregoing detailed description, which has been given for clearness of understanding only.

What I regard as new, and desire to secure by Letters Patent, is—

1. In mechanism of the character described, the combination with two or more independent triggers and trigger-actuating means, of a signal having sides in number corresponding to the number of triggers and operated by means of said trigger-actuating means, whereby the trigger to be operated is indicated on said signal.

2. In mechanism of the character described, the combination of a pivotally-mounted trigger equipped with a trigger-arm extending into the path of trigger-actuating mechanism, of trigger-actuating mechanism consisting of a rotatable member equipped with means for engaging and actuating said trigger-arm, a superposed member carrying means for rotating said rotatable member, and means for actuating said last-named member.

3. In mechanism of the character described, the combination of a pivotally-mounted spring-held trigger equipped with a trigger-arm extending into the path of trigger-actuating mechanism, of trigger-actuating mechanism consisting of a rotatable member provided with means for engaging and actuating said trigger and further provided with ratchet-teeth, independently-oscillating means for engaging said ratchet-teeth to rotate said first-named rotatable member, and mechanism for actuating said rotatable means.

4. In mechanism of the character described, the combination of a pivotally-mounted spring-held trigger equipped with a trigger-arm extending into the path of trigger-actuating mechanism, of trigger-actuating mechanism consisting of a rotatable member provided with means for engaging and actuating said trigger and further provided with ratchet-teeth, an independently-rotatable member carrying a pawl to engage said ratchet-teeth, and means for actuating said rotatable member.

5. In mechanism of the character described, the combination of a series of superposed independent, suitably-mounted triggers provided with spring-held trigger-arms extending into the path of trigger-actuating mechanism, of trigger-actuating mechanism comprising a rotary device provided with means for actuating said triggers, and means for actuating said rotary device.

6. In mechanism of the character described, the combination with a series of independent, suitably-supported triggers each provided with a trigger-arm extending into the path of trigger-actuating mechanism, of trigger-actuating mechanism consisting of a series of separately-formed members each carrying means for engaging and actuating said trigger-arms, and means for connecting and securing said members in positions relative to the point of contact of the trigger-actuating teeth with the trigger-arms, and means for actuating said series of separately-formed members.

7. In mechanism of the character described, the combination of a series of independent, suitably-supported spring-held triggers each having a trigger-arm extending into the path of trigger-actuating mechanism, with trigger-actuating mechanism consisting of a series of members rotatable about a common axis each carrying means for engaging and actuating said trigger-arms, means for connecting together said rotatable members, said rotatable members being provided with perforations to receive said last-named members, means for connecting together the said rotatable members, to cause them to rotate in a fixed relation to each other.

8. In mechanism of the character described, the combination of a series of independent, suitably-supported spring-held triggers each having a trigger-arm extending into the path of trigger-actuating mechanism, with trigger-actuating mechanism consisting of a series of members rotatable about a common axis, trigger-actuating teeth on said rotatable members into the path of which the trigger-arms extend, ratchet-teeth on the surface of the top disk of the series of said rotatable members, and actuating means for said trigger-actuating mechanism comprising a spring-held plate, and a pawl carried by said plate to engage said ratchet-teeth, means for operating said spring-held plate against the action of said spring whereby said pawl in its travel engages one of said rotatable members, and means for connecting together and securing the series of rotatable members to rotate the same as one.

9. In mechanism of the character described, the combination of a series of independent, suitably-supported spring-held triggers, each having a trigger-arm extending into the path of trigger-actuating mechanism, with trigger-actuating mechanism comprising a suitably-supported spindle, a series of independent members rotatable about the said spindle, trigger-actuating teeth on said rotatable members into the path of which the trigger-arms extend, and ratchet-teeth on the upper surface of the top disk of the series of said rotatable members, actuating means for said trigger-actuating mechanism comprising a plate located above said series of rotatable members and journaled on said spindle, a pawl carried by said plate to engage said ratchet-teeth, a coiled spring encircling said spindle and attached at one end thereto, means on said plate to which is secured the other end of said spring, an arm projecting from said plate, and a cord attached to said arm through the medium of which the said plate is oscillated about the spindle, and means for connecting and securing the rotatable members to rotate as one.

10. In mechanism of the character described, the combination of a series of suitably-mounted independent triggers each provided with a trigger-arm extending into the path of trigger-actuating mechanism, a suitably-mounted gear and a signal carried thereby, with trigger-actuating mechanism, means for actuating said last-named mechanism, and a gear carried by said trigger-actuating mechanism intermeshing with said first-named gear.

11. In mechanism of the character described, the combination of a series of suitably-mounted spring-held triggers each provided with a trigger-arm extending into the path of trigger-actuating mechanism, a suitably-supported gear, a projecting portion on said gear, in the path of movement of said trigger-arms serving as a stop therefor and provided with a socket, a two or more sided signal, a spindle removably secured in said socket and carrying said signal with trigger-actuating mechanism, means for actuating said last-named mechanism, and a gear carried by said trigger-actuating mechanism intermeshing with said first-named gear.

12. In mechanism of the character described, the combination of a series of suitably-mounted spring-held triggers each provided with a trigger-arm extending into the path of trigger-actuating mechanism, a suitably-supported gear, a projecting portion on said gear in the path of movement of said trigger-arm serving as a stop therefor and provided with a socket having a flat surface on its inner periphery, a two or more sided signal, and a spindle removably secured in said socket having a flat side on its outer periphery at its lower end portion corresponding with the flat surface in said socket and carrying said signal, with trigger-actuating mechanism, means for actuating said last-named mechanism, and a gear carried by said trigger-actuating mechanism intermeshing with said first-named gear.

13. In mechanism of the character described, the combination with a trigger provided with an arm, trigger-actuating mechanism into the path of which said arm extends, said mechanism comprising a rotatable member provided with trigger-actuating teeth, and means for actuating said rotatable member, of means, operated by said means for actuating said trigger-actuating mechanism, to engage said ratchet-teeth to limit the rotary movement of said rotatable member.

14. In mechanism of the character described, the combination of a trigger provided with an arm extending into the path of trigger-actuating mechanism, said last-named mechanism comprising a rotatable member provided with projecting teeth, and means for actuating said trigger-actuating mechanism, with means for limiting the rotary movement of said rotatable member, comprising an oscillating member which in its movement of oscillation intercepts the path of the said projecting teeth, and is operated through the medium of said means for actuating said trigger-actuating mechanism.

15. In mechanism of the character described, the combination of a trigger provided with an arm extending into the path of trigger-actuating mechanism, said last-named mechanism comprising a rotary member provided with trigger-actuating teeth on its side surface and ratchet-teeth on its upper surface, means for actuating said rotary member comprising a plate journaled above said rotary member carrying means for engaging the ratchet-teeth on the upper surface of said rotary member, and provided with two laterally-extending arms, one of the arms carrying a pin, and means attached to said plate to oscillate it, with an oscillating member provided with a shouldered surface and a cam-surface engaging said pin to produce oscillation whereby the said shouldered surface is caused to automatically intercept the path of the said trigger-actuating teeth upon the oscillation of said plate.

16. The combination of independently-actuated members, two or more rotary members through the medium of which said first-named members are actuated, means for adjusting said rotary members angularly with relation to each other, and a manually-actuated spring-retracted device serving to move said rotary members, for the purpose set forth.

17. The combination of a signal-standard, a series of independent triggers and a rotary device equipped with trigger-actuating means, and with signal-standard-actuating means, for the purpose set forth.

18. The combination of a series of triggers, a rotary signal, a combined trigger-actuating and signal-rotating device, and an escapement for said device, for the purpose set forth.

19. The combination of a signal equipped with a pinion, a series of triggers arranged in different planes, a rotary device equipped in different planes with trigger-actuating means and having connected therewith a gear intermeshing with said pinion, and a manually-actuated spring-retracted device serving to actuate said rotary device.

STEPHEN A. HUNTLEY.

In presence of—
W. L. SEDGWICK,
C. P. BOWMAN.